H. D. MILLS.
Hoe.
No. 164,021. Patented June 1, 1875.
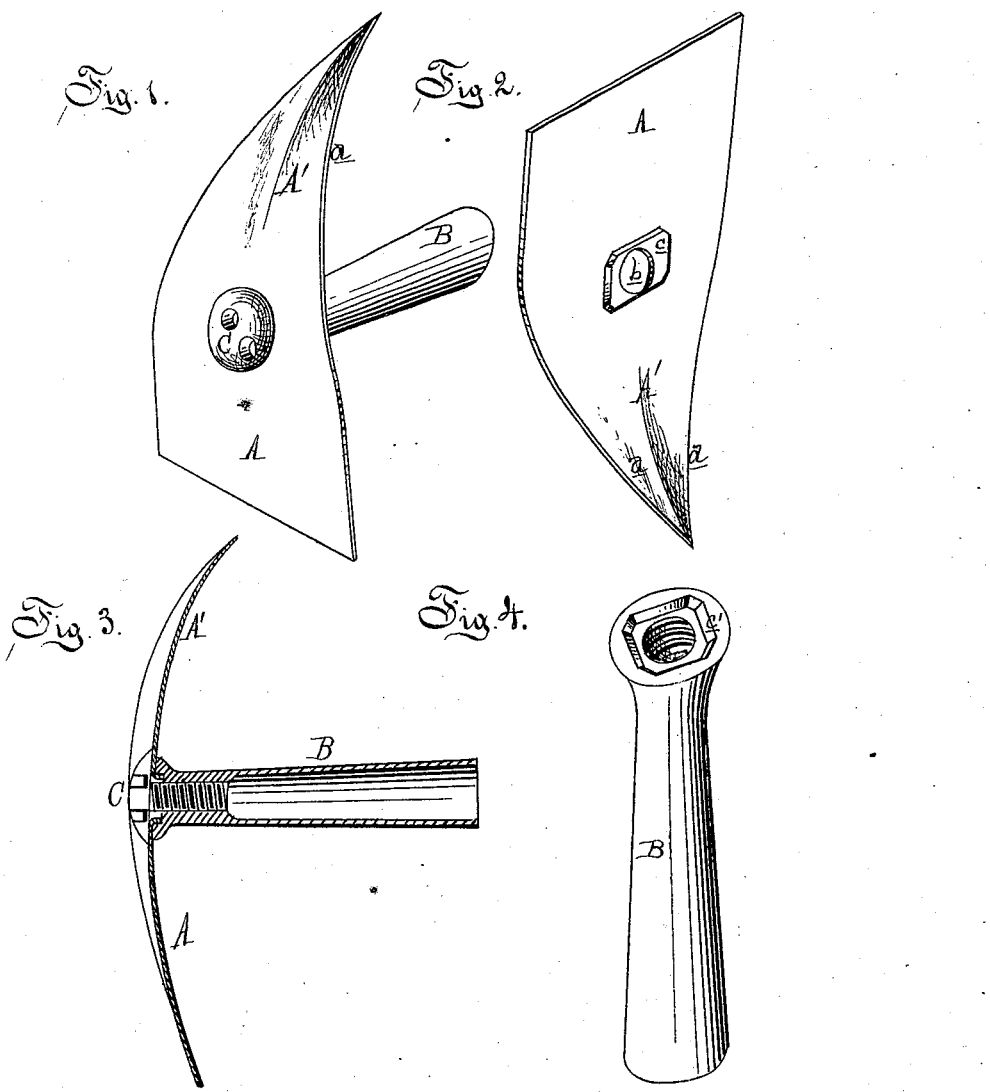

UNITED STATES PATENT OFFICE.

HENRY D. MILLS, OF OTSEGO, MICHIGAN.

IMPROVEMENT IN HOES.

Specification forming part of Letters Patent No. 164,021, dated June 1, 1875; application filed April 6, 1875.

*To all whom it may concern:*

Be it known that I, HENRY D. MILLS, of Otsego, in the county of Allegan and State of Michigan, have invented an Improved Hoe, of which the following is a specification:

The invention consists in the peculiar manner of securing it to the handle-socket, as more fully hereinafter set forth.

Figure 1 is a perspective view of the hoe and its socket, to which it is shown attached. Fig. 2 is a detached perspective view of the blade from the inner side. Fig. 3 is a longitudinal section through the blade and socket. Fig. 4 is a detached perspective view of the socket.

In the drawing, A represents a steel hoe-blade, having an upward prolongation, A', running to a point to form a pick. The edges of the tapered portion of the blade are turned or curved slightly outward, as at $a$ $a$, to free the soil as the pick is drawn toward the operator in working around roots, and in loosening the soil between plants growing close together, so as not to throw the dirt laterally upon them. Through the center of the blade a round hole, $b$, is made, around which the metal is countersunk, as at $c$. B is a metal ferrule or socket to receive the end of a wooden handle; its outer end has a countersunk recess, $c'$, to receive the projection $c$ on the under side of the blade. There is also a screw-threaded hole tapped in it, which receives a socket-headed screw, C, which secures the blade to the socket.

I am aware that hoes have been made wherein the blade is secured to the handle by a screw passing through the said blade into a metallic ferrule secured to the end of the handle, and prevented from turning by two projections on the ferrule that engage in notches cut in the blade; but a hoe thus made presents the disadvantage of greatly reducing the strength of the blade, and rendering it liable to crack. Now, therefore,

What I claim as my invention, and desire to secure by Letters Patent, is—

The hoe-blade A A', having the projection $c$, in combination with the socket B, having the recess $c'$, and screw C, when the several parts are constructed and arranged substantially as described and shown.

HENRY D. MILLS.

Witnesses:
C. M. STUCK,
D. A. DREW.